United States Patent
Tyler et al.

(10) Patent No.: US 10,864,677 B2
(45) Date of Patent: Dec. 15, 2020

(54) ADDITIVE MANUFACTURING SYSTEM IMPLEMENTING IN-SITU ANCHOR-POINT FABRICATION

(71) Applicant: CC3D LLC, Coeur d'Alene, ID (US)

(72) Inventors: Kenneth L. Tyler, Coeur d'Alene, ID (US); Ryan C Stockett, Lebanon, NH (US)

(73) Assignee: Continuous Composites inc., Coeur d'Alene, ID (US)

( * ) Notice: Subject to any disclaimer, the term of this patent is extended or adjusted under 35 U.S.C. 154(b) by 419 days.

(21) Appl. No.: 15/798,646

(22) Filed: Oct. 31, 2017

(65) Prior Publication Data

US 2018/0126655 A1 May 10, 2018

Related U.S. Application Data

(60) Provisional application No. 62/417,709, filed on Nov. 4, 2016.

(51) Int. Cl.
*B29C 64/209* (2017.01)
*B33Y 30/00* (2015.01)
(Continued)

(52) U.S. Cl.
CPC .......... *B29C 64/209* (2017.08); *B29C 64/106* (2017.08); *B29C 64/118* (2017.08);
(Continued)

(58) Field of Classification Search
CPC ... B29C 64/264; B29C 64/307; B29C 64/379; B29C 70/384; B29C 31/042
See application file for complete search history.

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
EP 2589481 B1 1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Jacob T Minskey
*Assistant Examiner* — Virak Nguon
(74) *Attorney, Agent, or Firm* — Ryan C. Stockett

(57) ABSTRACT

An additive manufacturing system may include a head configured to discharge a matrix-coated reinforcement, a support configured to move the head during discharging, and a cure enhancer configured to cure the matrix as the matrix-coated reinforcement discharges from the head. The additive manufacturing system may also include a controller in communication with the head, the support, and the cure enhancer. The controller may be configured to receive specifications for a structure to be fabricated, and to determine an anchor point from which the matrix-coated reinforcement will be pulled during fabrication of the structure. The controller may also be configured to regulate operation of the head, the support, and the cure enhancer to manufacture the structure and the anchor point.

19 Claims, 2 Drawing Sheets

(51) Int. Cl.
*B33Y 50/02* (2015.01)
*B33Y 40/00* (2020.01)
*B29C 64/118* (2017.01)
*B29C 64/386* (2017.01)
*B29C 64/20* (2017.01)
*B29C 64/393* (2017.01)
*B29C 64/106* (2017.01)
*B29C 70/38* (2006.01)
*B29C 64/291* (2017.01)
*B29C 64/245* (2017.01)
*B29C 64/141* (2017.01)
*B29C 64/264* (2017.01)
*B29C 64/307* (2017.01)
*B29C 64/379* (2017.01)
*B29C 64/336* (2017.01)
*B29C 64/165* (2017.01)
*B29C 64/227* (2017.01)
*B29C 64/40* (2017.01)
B33Y 10/00 (2015.01)
B29C 35/08 (2006.01)
B29C 35/02 (2006.01)
B29K 105/08 (2006.01)
B29B 15/12 (2006.01)
B29C 70/52 (2006.01)
B29C 31/04 (2006.01)
B29C 64/259 (2017.01)
B33Y 70/00 (2020.01)
B29C 64/295 (2017.01)

(52) U.S. Cl.
CPC .......... *B29C 64/141* (2017.08); *B29C 64/165* (2017.08); *B29C 64/20* (2017.08); *B29C 64/227* (2017.08); *B29C 64/245* (2017.08); *B29C 64/264* (2017.08); *B29C 64/291* (2017.08); *B29C 64/307* (2017.08); *B29C 64/336* (2017.08); *B29C 64/379* (2017.08); *B29C 64/386* (2017.08); *B29C 64/393* (2017.08); *B29C 64/40* (2017.08); *B29C 70/384* (2013.01); *B33Y 30/00* (2014.12); *B33Y 40/00* (2014.12); *B33Y 50/02* (2014.12); *B29B 15/122* (2013.01); B29C 31/042 (2013.01); B29C 35/0261 (2013.01); B29C 64/259 (2017.08); B29C 64/295 (2017.08); B29C 70/524 (2013.01); B29C 2035/0827 (2013.01); B29C 2035/0855 (2013.01); B29K 2105/08 (2013.01); B33Y 10/00 (2014.12); B33Y 70/00 (2014.12)

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Mit |
| 9,770,876 B2 | 9/2017 | Airbus |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1* | 3/2014 | Tyler ...................... B33Y 50/02 264/401 |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2014/0328963 A1 | 11/2014 | Mark et al. |
| 2015/0136455 A1 | 5/2015 | Fleming |
| 2015/0367576 A1* | 12/2015 | Page ...................... B33Y 30/00 264/257 |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |

(56) References Cited

U.S. PATENT DOCUMENTS

| | | |
|---|---|---|
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1* | 9/2016 | Boyd, IV ............... B28B 1/008 |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2017/0297250 A1 | 10/2017 | Tyler |
| 2018/0370117 A1* | 12/2018 | Gardiner ............... B33Y 10/00 |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2017122942 A1 | 7/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995). cited by applicant.

M. Martin-Gallego et al., Epoxy-Graphene UV-Cured Nanocomposites, Polymer, vol. 52, Issue 21, pp. 4664-4669 (Sep. 2011).

P. Compston, J, Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

(56) References Cited

OTHER PUBLICATIONS

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-805 (May 15, 2012).

International Search Report dated Jan. 25, 2018 for PCT/US17/59274 to CC3D LLC Filed Oct. 31, 2017.

* cited by examiner

ADDITIVE MANUFACTURING SYSTEM IMPLEMENTING IN-SITU ANCHOR-POINT FABRICATION

RELATED APPLICATIONS

This application is based on and claims the benefit of priority from U.S. Provisional Application No. 62/417,709 that was filed on Nov. 4, 2016, the contents of which are expressly incorporated herein by reference.

TECHNICAL FIELD

The present disclosure relates generally to a manufacturing system and, more particularly, to an additive manufacturing system implementing in-situ anchor-point fabrication.

BACKGROUND

Additive manufacturing is a process of creating three-dimensional parts by depositing overlapping layers of material onto a print bed, under the guided control of a computer. One technique of additive manufacturing is known as fused-deposition modeling (FDM). In FDM, a heated thermoplastic is pushed through a print head having a desired cross-sectional shape and size. The print head is moved in a predefined 2-dimensional trajectory as the thermoplastic discharges from the print head, such that the thermoplastic is laid down on the print bed in a particular pattern and shape of overlapping layers. The thermoplastic, after exiting the print head, hardens into a final form. Another technique of additive manufacturing is known as continuous composite three-dimensional printing (CC3D). In CC3D, a continuous fiber is connected to an existing anchor point (e.g., to the print bed), and then pushed and/or pulled through the print head along with a thermoset resin to act as reinforcement for the solidified part. Upon exiting the head, one or more cure enhancers mounted to the head instantly cure the thermoset resin, allowing for 3-dimensional printing in free-space.

Although both FDM and CC3D printing techniques can be used to fabricate parts that are acceptable for many applications, these techniques may be limited due to their connection to the print bed or another existing anchor point. In particular, most parts are anchored in some manner (e.g., to a build platform) during fabrication, and the use of predefined and fixed-type anchor points may limit a shape, size, and/or fiber orientation of the resulting part.

The disclosed system is directed to addressing one or more of the problems set forth above and/or other problems of the prior art.

SUMMARY

In one aspect, the present disclosure is directed to an additive manufacturing system. The additive manufacturing system may include a head configured to discharge a matrix-coated reinforcement, a support configured to move the head during discharging, and a cure enhancer configured to cure the matrix as the matrix-coated reinforcement discharges from the head. The additive manufacturing system may also include a controller in communication with the head, the support, and the cure enhancer. The controller may be configured to receive specifications for a structure to be fabricated, and to determine an anchor point from which the matrix-coated reinforcement will be pulled during fabrication of the structure. The controller may also be configured to regulate operation of the head, the support, and the cure enhancer to manufacture the structure and the anchor point.

In another aspect, the present disclosure is directed to another additive manufacturing system. This additive manufacturing system may include a head configured to discharge a matrix-coated reinforcement, a support configured to move the head during discharging, and a cure enhancer configured to cure the matrix as the matrix-coated reinforcement discharges from the head. The additive manufacturing system may also include a controller in communication with the head, the support, and the cure enhancer. The controller may be configured to determine a tensile force vector specified for a structure to be manufactured, to determine a number and location of an anchor point required to provide reactionary support against the tensile force vector, and to regulate operation of the head, the support, and the cure enhancer to manufacture the structure and the anchor point.

In yet another aspect, the present disclosure is directed to a method of additively manufacturing a composite structure. The method may include determining a tensile force vector specified for the composite structure, and determining a number and location of an anchor point required to provide reactionary support against the tensile force vector. The method may also include regulating operation of a moveable print head to manufacture the structure and the anchor point.

DETAILED DESCRIPTION

Figure 1:
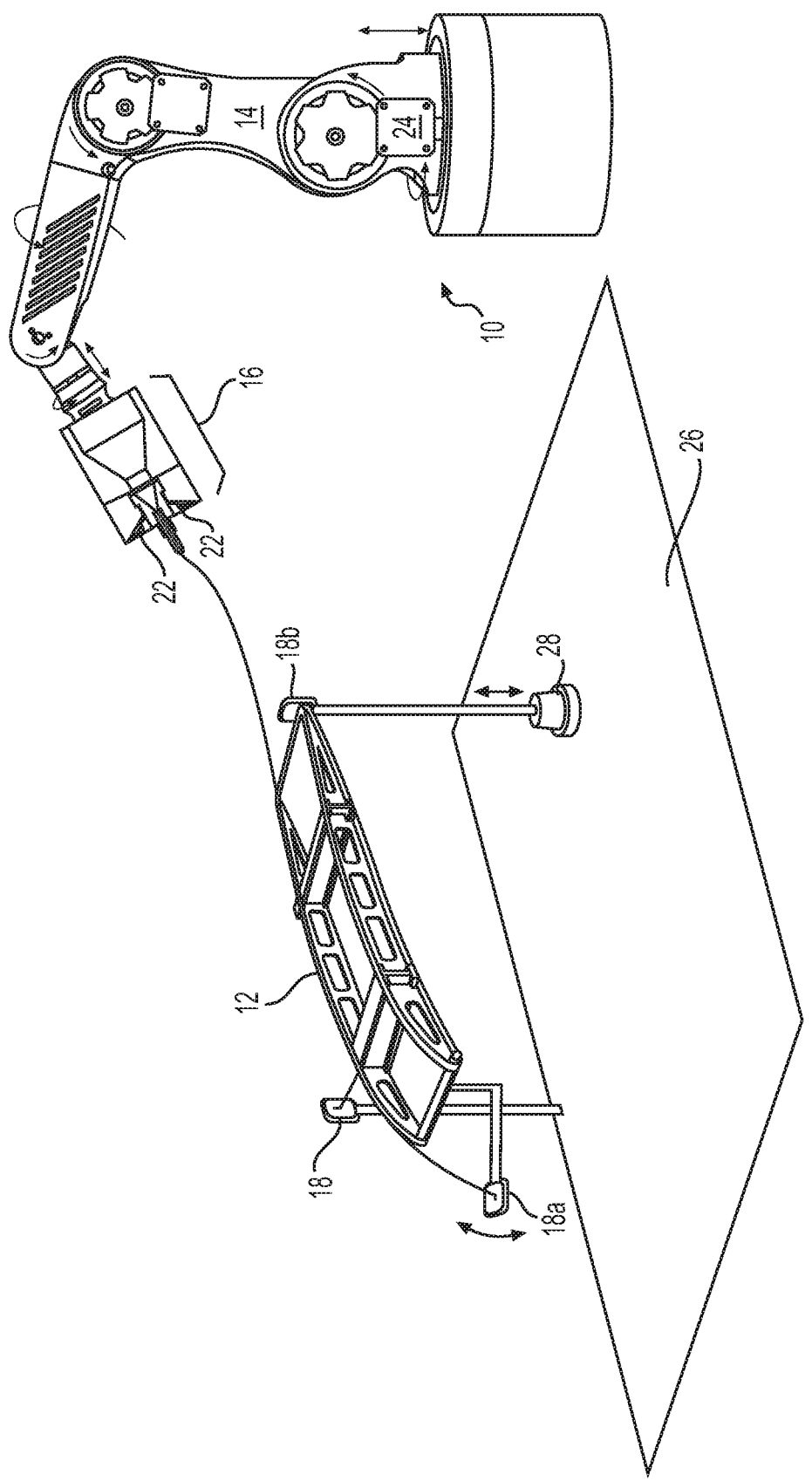
FIG. 1 is diagrammatic illustration of an exemplary disclosed manufacturing system.

FIG. 1 illustrates an exemplary system 10, which may be used to continuously manufacture a composite structure 12 having any desired cross-sectional shape (e.g., circular, polygonal, etc.). System 10 may include at least a support 14 and a head 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry also capable of moving head 16 in multiple directions during fabrication of structure 12. Although support 14 is shown as being capable of 6-axis movements, it is contemplated that any other type of support 14 capable of moving head 16 in the same or in a different manner could also be utilized, if desired. In some embodiments, a drive may mechanically couple head 16 to support 14, and may include components that cooperate to move and/or supply power or materials to head 16.

Head 16 may be configured to receive or otherwise contain a matrix material. The matrix material may include any type of matrix material (e.g., a liquid resin, such as a zero volatile organic compound resin; a powdered metal; etc.) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix material inside head 16 may be pressurized, for example by an external device (e.g., an extruder or another type of pump—not shown) that is fluidly connected to head 16 via a corresponding conduit (not shown). In another embodiment, however, the pressure may be generated completely inside of head 16 by a similar type of device. In yet other embodiments, the matrix material may be gravity-fed through and/or mixed within head 16. In some instances, the matrix material inside head 16 may need to be kept cool and/or dark to inhibit premature curing; while in other instances, the matrix material may need to be kept warm for the same reason. In either situation, head 16 may be specially configured (e.g., insulated, chilled, and/or warmed) to provide for these needs.

The matrix material may be used to coat, encase, or otherwise surround any number of continuous reinforcements (e.g., separate fibers, tows, rovings, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix material discharging from head 16.

The reinforcements may be exposed to (e.g., coated with) the matrix material while the reinforcements are inside head 16, while the reinforcements are being passed to head 16, and/or while the reinforcements are discharging from head 16, as desired. The matrix material, dry reinforcements, and/or reinforcements that are already exposed to the matrix material (e.g., wetted reinforcements) may be transported into head 16 in any manner apparent to one skilled in the art.

The matrix material and reinforcement may be discharged from head 16 via at least two different modes of operation. In a first mode of operation, the matrix material and reinforcement are extruded (e.g., pushed under pressure and/or mechanical force) from head 16, as head 16 is moved by support 14 to create the 3-dimensional shape of structure 12. In a second mode of operation, at least the reinforcement is pulled from head 16, such that a tensile stress is created in the reinforcement during discharge. In this mode of operation, the matrix material may cling to the reinforcement and thereby also be pulled from head 16 along with the reinforcement, and/or the matrix material may be discharged from head 16 under pressure along with the pulled reinforcement. In the second mode of operation, where the matrix material is being pulled from head 16, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from head 16 as a result of head 16 moving away from an anchor point 18. In particular, at the start of structure-formation, a length of matrix-impregnated reinforcement may be pulled and/or pushed from head 16, deposited onto anchor point 18, and cured, such that the discharged material adheres to anchor point 18. Thereafter, head 16 may be moved away from anchor point 18, and the relative movement may cause the reinforcement to be pulled from head 16. It should be noted that the movement of the reinforcement through head 16 could be assisted (e.g., via internal feed mechanisms), if desired. However, the discharge rate of the reinforcement from head 16 may primarily be the result of relative movement between head 16 and anchor point 18, such that tension is created within the reinforcement. It is contemplated that anchor point 18 could be moved away from head 16 instead of or in addition to head 16 being moved away from anchor point 18.

One or more cure enhancers (e.g., one or more light sources, an ultrasonic emitter, a laser, a heater, a catalyst dispenser, a microwave generator, etc.) 22 may be mounted proximate (e.g., within, on, and/or trailing from) head 16 and configured to enhance a cure rate and/or quality of the matrix material as it is discharged from head 16. Cure enhancer 22 may be controlled to selectively expose internal and/or external surfaces of structure 12 to energy (e.g., light energy, electromagnetic radiation, vibrations, heat, a chemical catalyst or hardener, etc.) during the formation of structure 12. The energy may increase a rate of chemical reaction occurring within the matrix material, sinter the material, harden the material, or otherwise cause the material to cure as it discharges from head 16.

A controller 24 may be provided and communicatively coupled with support 14, head 16, and any number and type of cure enhancers 22. Controller 24 may embody a single processor or multiple processors that include a means for controlling an operation of system 10. Controller 24 may include one or more general- or special-purpose processors or microprocessors. Controller 24 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 24, including power supply circuitry, signal-conditioning circuitry, solenoid/motor driver circuitry, communication circuitry, and other appropriate circuitry. Moreover, controller 24 may be capable of communicating with other components of system 10 via wired and/or wireless transmission.

One or more maps may be stored in the memory of controller 24 and used during fabrication of structure 12. Each of these maps may include a collection of data in the form of lookup tables, graphs, and/or equations. In the disclosed embodiment, the maps may be used by controller 24 to determine force vectors specified for each reinforcement or grouping of reinforcements within structure 12. The force vectors may consist of a trajectory of the reinforcement(s), and/or a magnitude of the tensile stresses to be induced within the reinforcement(s). Based on this information, controller 24 may be programmed to determine a number and/or placement of anchor points 18 that are required to provide reactionary support against the force vectors (i.e., to provide a location from which the reinforcement(s) can be pulled and stretched). Further, the maps may be used by controller 24 to determine a size, shape, location, orientation, motion, and/or consist (e.g., included functional elements—described in more detail below) of each anchor point 18. Thereafter, controller 24 may be configured to control support 14, head 16, and cure enhancers 22 to dynamically produce the required anchor points 18.

Anchor points 18 may be fabricated prior to or simultaneous with manufacture of structure 12, and extend from a build chamber (e.g., from a print bed or wall) 26 and/or from structure 12 itself. For example, one or more anchor points 18 may be discharged by head 16 directly onto the print bed prior to any portion of structure 12 being created. The location, orientation, size, shape, and/or material of these anchor point(s) 18 may be determined based on a known shape, size, orientation, material and/or layout of structure 12 within build chamber 26 (e.g., based on a virtual model of structure 12 and/or build chamber 26). These anchor point(s) 18 may be fabricated with the same reinforcement and/or matrix as structure 12, or with a different reinforcement and/or matrix. In some embodiments, anchor point(s) 18 may not include any reinforcement. Alternatively, anchor points 18 may be fabricated only after a portion of structure 12 has already been fabricated. For example, FIG. 1 illustrates an anchor point 18a extending from a lower frame member of structure 12.

Anchor points 18 may be fixed or moveable. For example, anchor point(s) 18 may be affixed (e.g., via matrix curing) to one or more moveable fixtures 28 (e.g., mechanisms that are attached to build chamber 26). Fixtures 28 may include, for example, a linear device (e.g., a piston or rack), a rotary mechanism (e.g., a pivot joint, hinge, or screw), an actuator (e.g., a linear or rotary motor), etc. that allows for manual and/or automated movement of the corresponding anchor point(s) 18 during and/or after formation. These movements may allow for fine adjustment of anchor point position and/or orientation, or for desired transition between fabrication stages of structure 12.

Structure 12 may be only tethered to anchor points 18 via a reinforcement or have a surface that is fabricated directly against anchor point(s) 18, as desired. In an example shown in FIG. 1, structure 12 is only tethered to anchor point 18 via a sacrificial length of reinforcement (e.g., a cured or uncured length of matrix-coated reinforcement or un-coated reinforcement). In this example, after fabrication of structure 12 is complete, the tether may be severed at structure 12 and then discarded. In another example shown in FIG. 1, structure 12 is directly fabricated onto a second anchor point 18b. In this example, after fabrication of structure 12 is complete, the corresponding surface of structure 12 may be separated from anchor point 18b (e.g., pried away, cut apart, etc.) without the loss of sacrificial material. This latter example may provide a more-solid connection with structure 12, but also a lower quality of surface finish.

Figure 2:
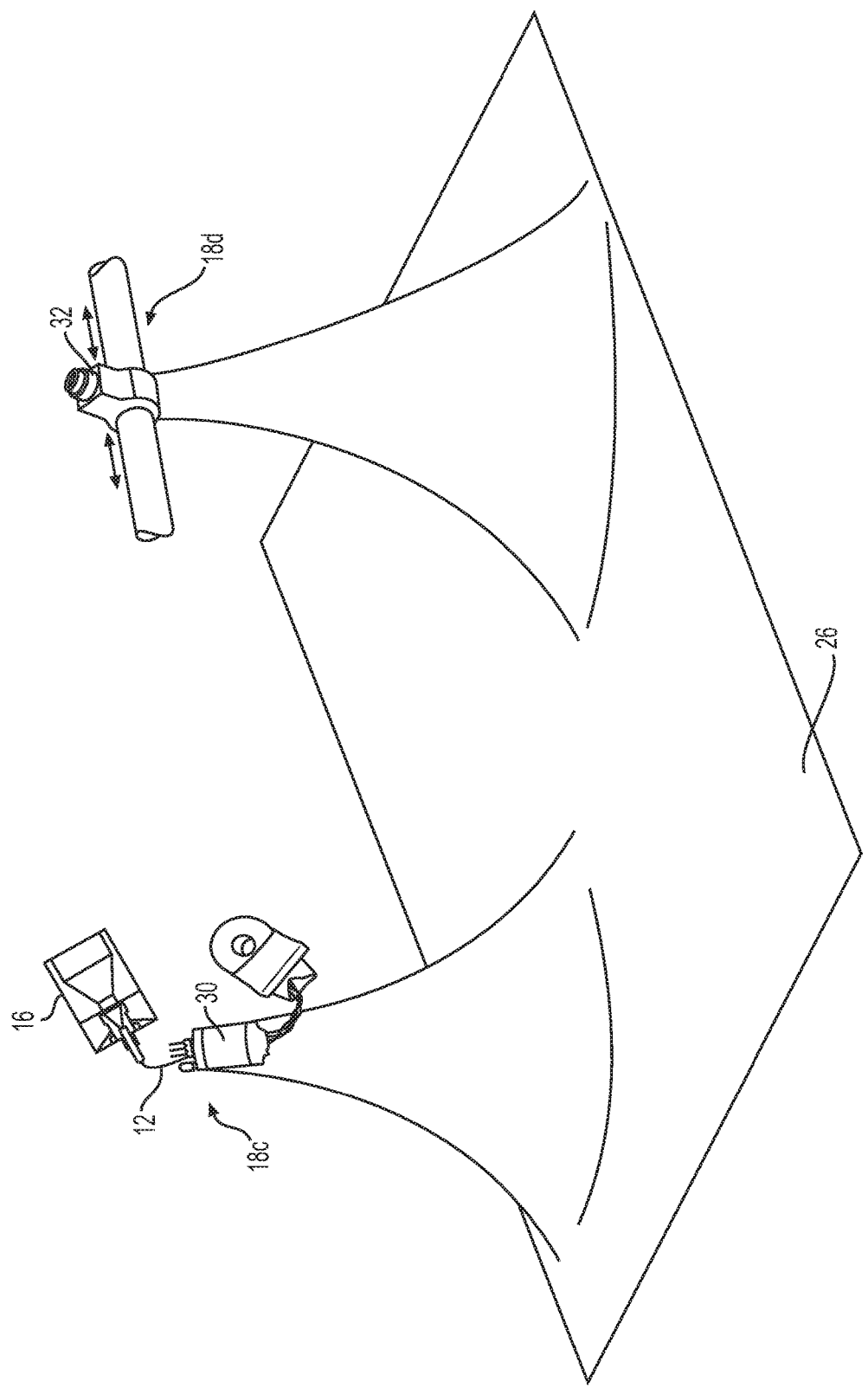
FIG. 2 is diagrammatic illustration of exemplary anchor points that can be fabricated by the manufacturing system of FIG. 1.

As illustrated in FIG. 2, each anchor point 18 may be used to secure structure 12 during fabrication in only one direction (see, for example, anchor point 18c) or in multiple directions (see, for example, anchor point 18d). In addition, one or more of anchor points 18 may include functional elements that are used only temporarily during structure-fabrication or that form a permanent part of structure 12. For example, a heating electrode 30 is positioned at anchor point 18c and used to provide a particular level of cure at this location in structure 12. In another example, a coupling or sensor port 32 is positioned at anchor point 18d that will remain in structure 12 after anchor point 18c is cut away. As a coupling 32, the functional element at anchor point 18d may allow for subsequent disassembly of structure 12. As a sensor port 32, the functional element at anchor point 18b may allow for subsequent assembly of a sensor into sensor port 32. Other functional elements that may be mounted at (e.g., be a part of) anchor point 18 and temporarily or permanently made a part of structure 12 include, for example, LEDs, capacitors, batteries, resistors, transistors, inductors, integrated circuits, actuators, etc.

INDUSTRIAL APPLICABILITY

The disclosed system may be used to continuously manufacture composite structures having any desired cross-sectional shape and length. The composite structures may include any number of different fibers of the same or different types and of the same or different diameters. In addition, the disclosed system may be used to dynamically fabricate anchor points that aid in the contemporaneous and subsequent fabrication of the composite structures. These anchor points may be temporarily or permanently connected to the structures, stationary or moveable, and inert or functional, as desired. Operation of system 10 will now be described in detail.

At a start of a manufacturing event, information regarding a desired structure 12 may be loaded into system 10 (e.g., into controller 24 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.), connection geometry (e.g., locations and sizes of couplings, tees, splices, etc.), desired weave patterns, weave transition locations, strength requirements, fiber orientations, etc. It should be noted that this information may alternatively or additionally be loaded into system 10 at different times and/or continuously during the manufacturing event, if desired. Based on the component information, one or more different reinforcements and/or matrix materials may be selectively installed and/or continuously supplied into system 10. In some embodiments, the fiber(s) may also need to be connected to a pulling machine (not shown) and/or to a mounting fixture (e.g., to anchor point 18). Installation of the matrix material may include filling head 16 and/or coupling of an extruder (not shown) to head 16.

In some embodiments, depending on the gathered component information, and any number of different anchor points 18 may be fabricated and selectively used by head 16 during fabrication of structure 12. This may include, for example, integrating a functional element (e.g., electrode 30 and/or coupling 32) into a distal end of an anchor point 18. It is contemplated that the functional element may be manually placed at a desired location partway through or after fabrication of the anchor point 18, or that the functional element may be picked-and-placed automatically (e.g., by head 16 or another appendage of system 10) under the direction of controller 24.

After formation of any required anchor points 18, head 16 may be moved by support 14 under the regulation of controller 24 to cause matrix-coated reinforcements to be placed against or on the corresponding anchor point(s) 18. Cure enhancers 22 may then be selectively activated (e.g., turned on/off, aimed, overlapped, and/or intensity-adjusted by controller 24) to cause hardening of the matrix material surrounding the reinforcements, thereby bonding the reinforcements to anchor point(s) 18.

The component information may then be used to control fabrication of structure 12. For example, the reinforcements may be pulled and/or pushed along with the matrix material from head 16. Support 14 may also selectively move head 16 in a desired manner, such that an axis of the resulting structure 12 follows a desired trajectory. Once structure 12 has grown to a desired length, structure 12 may be severed from system 10 in any desired manner.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. An additive manufacturing system, comprising:
   a head configured to discharge a matrix-coated reinforcement;
   a support configured to move the head during discharging;
   a cure enhancer configured to cure a matrix in the matrix-coated reinforcement as the matrix-coated reinforcement discharges from the head; and
   a controller in communication with the head, the support, and the cure enhancer, the controller being configured to:
      receive specifications for a structure to be fabricated;
      determine an anchor from which the matrix-coated reinforcement will be pulled during fabrication of the structure; and
      regulate operation of the head, the support, and the cure enhancer to:
         manufacture the anchor;
         adhere the matrix-coated reinforcement to a point on the anchor; and
         move the head away from the anchor to pull the matrix-coated reinforcement from the head.

2. The additive manufacturing system of claim 1, wherein the controller is configured to determine the anchor based on a trajectory of the matrix-coated reinforcement within the structure.

3. The additive manufacturing system of claim 2, wherein the controller is configured to determine the anchor based further on a force vector specified for the matrix-coated reinforcement.

4. The additive manufacturing system of claim 2, wherein the controller is configured to determine the anchor based further on a magnitude of tensile stress to be induced in the matrix-coated reinforcement.

5. The additive manufacturing system of claim 1, wherein the controller is configured to determine a number, location, orientation, size, and shape of the anchor.

6. The additive manufacturing system of claim 1, wherein the controller is configured to regulate operation of the head, the support, and the cure enhancer to manufacture the anchor on a print chamber surface.

7. The additive manufacturing system of claim 1, wherein the controller is configured to regulate operation of the head, the support, and the cure enhancer to manufacture the anchor on the structure.

8. The additive manufacturing system of claim 1, wherein the anchor is adjustable after manufacture.

9. The additive manufacturing system of claim 8, wherein the anchor is manufactured on a moveable fixture.

10. The additive manufacturing system of claim 1, wherein the anchor includes a functional element.

11. The additive manufacturing system of claim 10, wherein the functional element is only temporarily connected to the structure.

12. The additive manufacturing system of claim 10, wherein the functional element becomes a permanent part of the structure.

13. The additive manufacturing system of claim 1, wherein the anchor is manufactured from the matrix-coated reinforcement.

14. The additive manufacturing system of claim 1, wherein the anchor is manufactured from only a matrix.

15. The additive manufacturing system of claim 1, wherein the structure is only tethered to the anchor.

16. The additive manufacturing system of claim 1, wherein the structure is tethered to the anchor by at least one of an uncured matrix-coated reinforcement or an uncoated reinforcement.

17. The additive manufacturing system of claim 1, wherein the structure extends in multiple directions away from the anchor.

18. An additive manufacturing system, comprising:
   a head configured to discharge a matrix-coated reinforcement;
   a support configured to move the head during discharging;
   a cure enhancer configured to cure a matrix in the matrix-coated reinforcement as the matrix-coated reinforcement discharges from the head; and
   a controller in communication with the head, the support, and the cure enhancer, the controller being configured to:
      determine a tensile force vector specified for a structure to be manufactured;
      determine a number and location of an anchor required to provide reactionary support against the tensile force vector; and
      regulate operation of the head, the support, and the cure enhancer to:
         manufacture the anchor;
         adhere the matrix-coated reinforcement to a point on the anchor; and
         move the head away from the anchor to pull the matrix-coated reinforcement from the head.

19. The additive manufacturing system of claim 18, wherein the anchor includes a functional element that becomes a permanent part of the structure.

* * * * *